(12) United States Patent
Hirota et al.

(10) Patent No.: US 8,634,047 B2
(45) Date of Patent: Jan. 21, 2014

(54) LIQUID CRYSTAL DISPLAY DEVICE AND ELECTRONIC APPARATUS

(75) Inventors: Takenori Hirota, Suwa (JP); Tomokazu Umeno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 214 days.

(21) Appl. No.: 13/341,124

(22) Filed: Dec. 30, 2011

(65) Prior Publication Data

US 2012/0188497 A1 Jul. 26, 2012

(30) Foreign Application Priority Data

Jan. 21, 2011 (JP) ................................ 2011-010576

(51) Int. Cl.
*G02F 1/1337* (2006.01)

(52) U.S. Cl.
USPC ........................................................ 349/123

(58) Field of Classification Search
USPC ........................................................ 349/123
See application file for complete search history.

(56) References Cited

U.S. PATENT DOCUMENTS

| | | | | |
|---|---|---|---|---|
| 6,236,440 B1 * | 5/2001 | Johnson et al. | ............... | 349/122 |
| 6,995,821 B1 * | 2/2006 | Lu et al. | ........................ | 349/113 |
| 8,044,392 B2 * | 10/2011 | Song et al. | ....................... | 257/40 |
| 2005/0012877 A1 | 1/2005 | Sasaki | | |
| 2005/0057715 A1 | 3/2005 | Hashimoto | | |
| 2007/0019126 A1 * | 1/2007 | Rhee et al. | ...................... | 349/56 |
| 2009/0079920 A1 * | 3/2009 | Aoki | .............................. | 349/114 |
| 2009/0147205 A1 * | 6/2009 | Mizuno et al. | ................ | 349/153 |
| 2009/0273749 A1 * | 11/2009 | Miyamoto et al. | ............ | 349/114 |
| 2010/0079686 A1 * | 4/2010 | Kawakami | ......................... | 349/5 |
| 2010/0181013 A1 | 7/2010 | Ishida et al. | | |
| 2011/0025973 A1 * | 2/2011 | Kaneiwa et al. | .............. | 349/193 |
| 2011/0234960 A1 | 9/2011 | Nishida et al. | | |
| 2012/0013836 A1 * | 1/2012 | Teraoka et al. | ............... | 349/124 |

FOREIGN PATENT DOCUMENTS

| | | |
|---|---|---|
| JP | 2005-49817 A | 2/2005 |
| JP | 2005-84586 A | 3/2005 |
| JP | 2008-248381 A | 10/2008 |
| JP | 2010-134180 A | 6/2010 |
| JP | 2011-209387 A | 10/2011 |
| JP | 2011-209528 A | 10/2011 |

* cited by examiner

*Primary Examiner* — Timothy L Rude

(74) *Attorney, Agent, or Firm* — ALG Intellectual Property, LLC

(57) ABSTRACT

A liquid crystal display device includes a device substrate that includes a pixel electrode, a counter substrate that is formed opposite the device substrate and that includes a counter electrode, a liquid crystal layer that is formed between the device substrate and the counter substrate, a first alignment layer that is formed on a side of the device substrate which is closer to the liquid crystal layer, and a second alignment layer that is formed on a side of the counter substrate which is closer to the liquid crystal layer. The pixel electrode is made of a material having a work function smaller than that of a material for the counter electrode. The first alignment layer has substantially the same density as that of the second alignment layer, and the thickness d1 of the first alignment layer is greater than the thickness d2 of the second alignment layer.

10 Claims, 4 Drawing Sheets

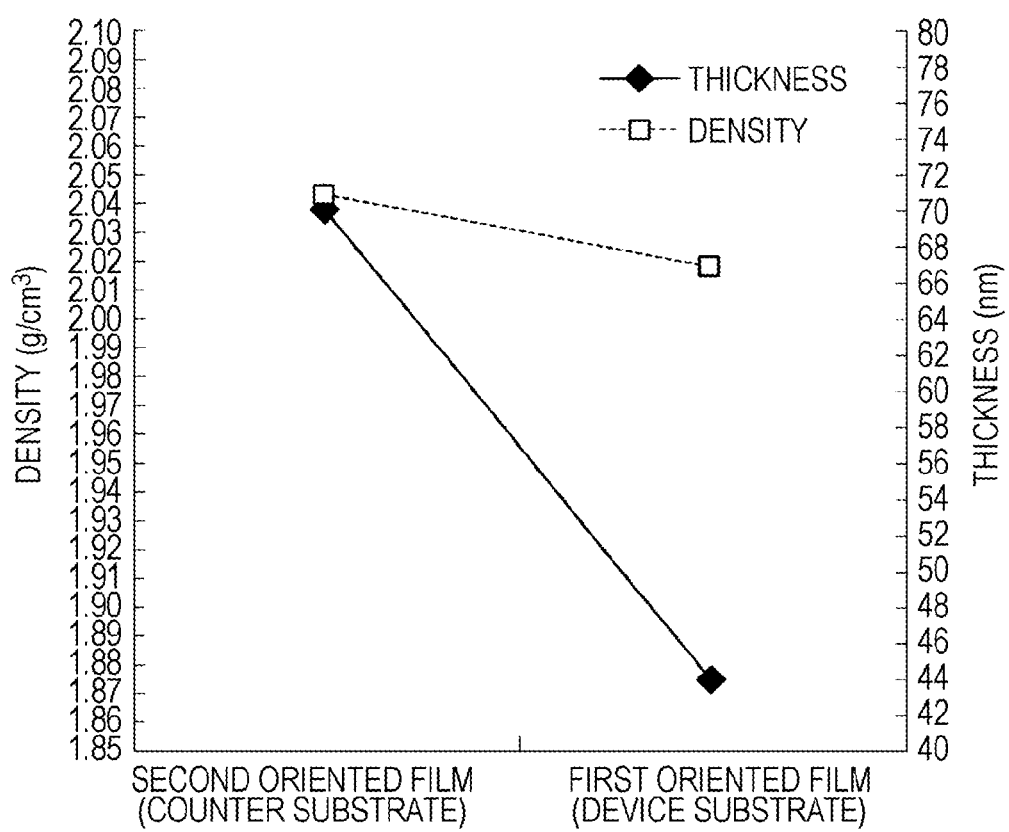

LIQUID CRYSTAL DISPLAY DEVICE AND ELECTRONIC APPARATUS

BACKGROUND

1. Technical Field

The present invention relates to a liquid crystal display device and an electronic apparatus.

2. Related Art

In recent years, reflective liquid crystal display devices are being increasingly applied to projectors, for their ease of designing high contrast and a dustproof optical system. In a typical reflective liquid crystal display device, the pixel electrodes are made of a material for reflecting electrodes such as Al or Ag, and the counter electrodes are made of a material for transparent electrodes such as indium tin oxide (ITO) or indium zinc oxide (IZO), in order to achieve the reflective display function.

However, in such a reflective liquid crystal display device, due to an imbalance occurring between the work functions of the materials for the pixel and counter electrodes, the electric potential of the counter electrodes (LCCOM) tends to greatly shift either positively or negatively. In other words, a so-called "LCCOM shift" phenomenon occurs among the counter electrodes. When a liquid crystal display device operates in this state, some display defects, such as flickering and image-stickings, could possibly appear on a displayed image.

Some techniques have been developed to overcome the above disadvantage. For example, JP-A-2005-49817 has proposed a reflective liquid crystal display device in which a work function adjusting layer is formed on the pixel electrodes. In this device, the sum of the work functions of the materials for the pixel electrodes and the work function adjusting layer is substantially the same as the work function of the material for the counter electrodes. Thus, the work function adjusting layer counteracts the imbalance occurring between the work functions of the materials for the pixel and counter electrodes.

However, in the abovementioned display device, an additional process of forming the work function adjusting layer on the pixel electrodes is involved. This process increases the amount of fabrication work, and complicates the structure of the device.

SUMMARY

Advantages of some aspects of the invention are a reflective liquid crystal display device and an electronic apparatus which have an easily fabricated, simple structure, and achieve a high quality display performance by restricting the occurrence of display defects such as flickering.

A liquid crystal display device according to a first aspect of the invention includes a device substrate that includes a pixel electrode, a counter substrate that includes a counter electrode and that is formed opposite the device substrate, a liquid crystal layer that is formed between the device substrate and the counter substrate, a first alignment layer that is formed on a side of the device substrate which is closer to the liquid crystal layer, and a second alignment layer that is formed on a side of the counter substrate which is closer to the liquid crystal layer. The pixel electrode is made of a material having a work function smaller than that of a material for the counter electrode. The first alignment layer has substantially the same density as that of the second alignment layer, and the first alignment layer has a thickness greater than that of the second alignment layer.

As a result of diligent study, the inventors of this application have found that controlling the densities and thicknesses of the first alignment layer and second alignment layer is important in restricting the LCCOM shift. On the basis of this fact, the inventors have completed the liquid crystal display device according to the first aspect of the invention. The liquid crystal display device according to the first aspect of the invention has the structure in which the first alignment layer has substantially the same density as that of the second alignment layer, and the first alignment layer has the thickness greater than that of the second alignment layer. This structure counteracts the imbalance occurring between the work functions of the materials for the pixel electrode and the counter electrode, thereby restricting the LCCOM shift. Furthermore, the first alignment layer and second alignment layer can be fabricated from similar materials, and any additional layer such as the work function adjusting layer does not need to be formed on the pixel electrode. As a result, no extra effort is required and the complexity of the structure of the liquid crystal display device is not increased. Consequently, it is possible to provide the liquid crystal display device which has the easily fabricated, simple structure, and achieves the high quality display performance by restricting the occurrence of display defects such as flickering.

In the liquid crystal display device, it is preferable that the pixel electrode be made of Al, and the counter electrode be made of ITO.

In the abovementioned liquid crystal display device, the imbalance between the work functions of the materials for the pixel electrode and counter electrode, or the imbalance between the properties of the materials for the device substrate and counter substrate is more prominent than when both the pixel electrode and counter electrode are made of the same material such as ITO. Since the properties of the device substrate and counter substrate sandwiching the liquid crystal layer are different from each other, the liquid crystal display device generates a greater LCCOM shift than the liquid crystal display device does in which the pixel electrode and counter electrode are made of the same material such as ITO. As a result, the liquid crystal display device can improve the display performance by restricting the occurrence of display defects such as flickering.

In the liquid crystal display device, it is preferable that the ratio of the thickness of the first alignment layer to the thickness of the second alignment layer be set to fall within a range of more than 1/1 to less than 1.2/1.

In the abovementioned liquid crystal display device, the thickness ratio is optimized to restrict the occurrence of display defects such as flickering, consequently improving the display performance effectively. In contrast, if the ratio of the first alignment layer thickness to the second alignment layer thickness is 1/1, that is, if the first alignment layer is as thick as the second alignment layer, then the liquid crystal display device fails to provide the above-described quality. Also, if the ratio of the first alignment layer thickness to second alignment layer thickness is less than 1/1, then the display quality of the liquid crystal display device may not be improved effectively, because the first alignment layer is too thin. Likewise, if the ratio of the first alignment layer thickness to the second alignment layer thickness is equal to or more than 1.2/1, then the display quality of the liquid crystal display device may not be improved effectively, because the first alignment layer is too thick.

In the liquid crystal display device, it is preferable that the first alignment layer and second alignment layer be made of silicon oxide.

The abovementioned liquid crystal display device possesses excellent heat and light resistance properties. Accordingly, it is possible to provide the liquid crystal display device that is ideal for use in projectors.

In the liquid crystal display device, it is preferable that the liquid crystal layer be made of a liquid crystal composition containing, as a main component, a liquid crystal material having negative dielectric anisotropy.

The abovementioned liquid crystal display device can be of a vertical alignment (VA) type possessing high contrast. Accordingly, it is possible to provide the liquid crystal display device that is ideal for use in projectors.

An electronic apparatus according to a second aspect of the invention includes the liquid crystal display device according to the first aspect of the invention.

The projector according to the second aspect of the invention achieves the high-quality display performance by restricting the occurrence of display defects such as flickering, because this projector is equipped with the liquid crystal display device according to the first aspect.

BRIEF DESCRIPTION OF THE DRAWINGS

The invention will be described with reference to the accompanying drawings, wherein like numbers reference like elements.

FIG. 4 is a graph illustrating relationships, in the density and the thickness, between a first alignment layer and a second alignment layer in a liquid crystal display device according to a comparative sample.

DESCRIPTION OF EXEMPLARY EMBODIMENTS

A description will be given below of a liquid crystal display device according to an embodiment of the invention, with reference to the accompanying drawings. The following embodiment is merely an example of the invention, and does not intend to limit the invention. In addition, various modifications or variations to the invention can be made without departing from the technical spirit of the claims. It should be noted that the drawings illustrate components or parts differing in scale, number, etc. from actuality for easy understanding of each structure.

Embodiment

Figure 1:
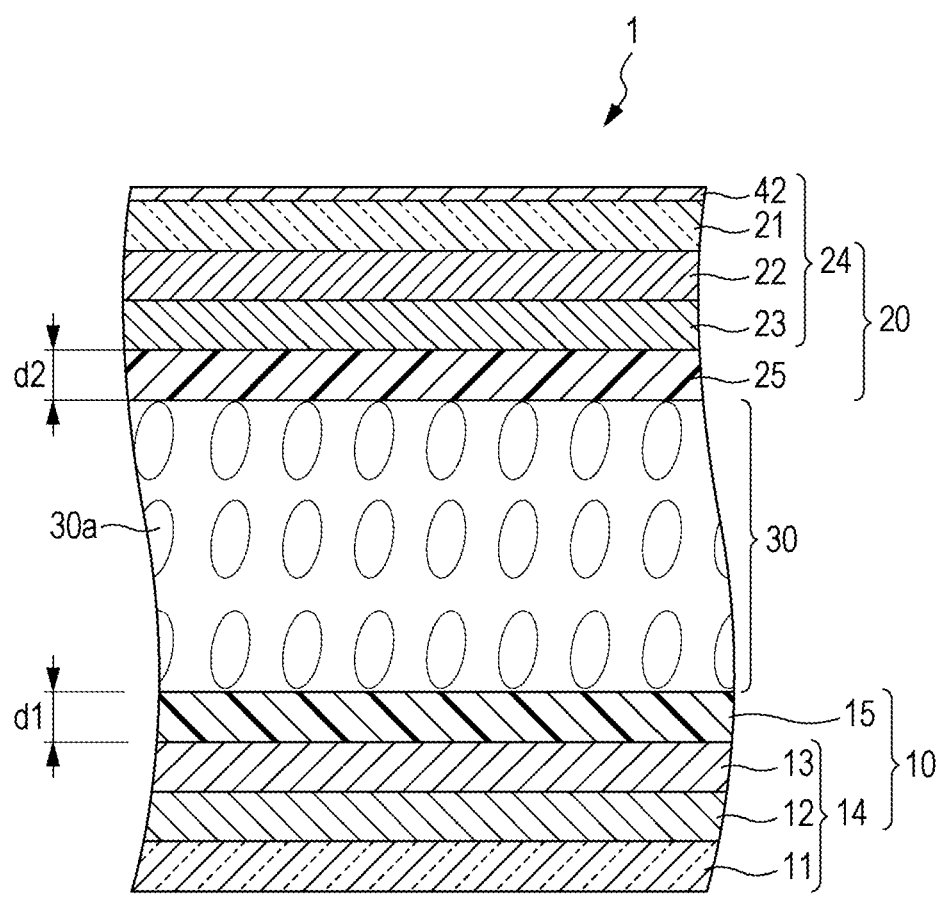
FIG. 1 is a general cross-sectional view illustrating a liquid crystal display device according to an embodiment of the invention.

FIG. 1 illustrates a schematic cross section of a liquid crystal display device 1 according to an embodiment of the invention. This liquid crystal display device 1 includes a device substrate 10, a counter substrate 20 formed opposite the device substrate 10, and a liquid crystal layer 30 formed between the device substrate 10 and counter substrate 20. This liquid crystal layer 30 is made of a liquid crystal material having negative dielectric anisotropy, and the initial orientation thereof is set to a vertical orientation. The liquid crystal display device 1 is of a reflective type with an active matrix system employing a thin-film transistor (TFT) element to function as a switching element.

The device substrate 10 includes a base material section 14 and a first alignment layer 15 formed on a surface of the base material section 14. The first alignment layer 15 serves the purpose of applying a pretilt angle of liquid crystal molecules 30a at a predetermined value. This first alignment layer 15 is formed by means of an oblique evaporation process, for example, under the condition of an evaporation angle at 50° and a degree of vacuum at $5.5 \times 10^{-3}$ Pa. In this embodiment, the density $\rho 1$ of the first alignment layer 15 is approximately 1.93 g/cm$^3$, while the thickness d1 thereof is approximately 74.4 nm.

The base material section 14 is mainly formed of a substrate body 11 made of a transparent material such as glass. On the inner surface of the substrate body 11, a pixel electrode 12 made of a conductive, highly reflective material such as Al or Ag is formed. In addition, on the pixel electrode 12, a passivation film 13 is formed by means of a PVD process such as vacuum deposition or spattering (DC spattering), or a CVD process. The passivation film 13 may be made of silicon oxide (SiOx). Alternatively, the passivation film 13 may be made of silicon nitride (SiNx) or aluminum oxide (AlxOy), wherein "x" and "y" are positive integers.

The device substrate 10 is provided with a TFT element to function as a switching element for controlling the electrical connection of the pixel electrode 12, data and scanning lines (not illustrated) for supplying image signals, and the like. Note that the data and scanning lines may also function as a light-shielding layer.

The counter substrate 20 includes a base material section 24 and a second alignment layer 25 formed on a surface of the base material section 24. The second alignment layer 25 serves the purpose of applying the pretilt angle of the liquid crystal molecules 30a at a predetermined value. The second alignment layer 25 is formed by means of an oblique evaporation process, for example, under the condition of the evaporation angle at 50° and a degree of vacuum at $5.5 \times 10^{-3}$ Pa. In this embodiment, the density $\rho 2$ of the second alignment layer 25 is approximately 1.93 g/cm$^3$, similar to the density $\rho 1$ of the first alignment layer 15. Meanwhile, the thickness d2 of the second alignment layer 25 is approximately 71.6 nm, and is less than the thickness d1 of the first alignment layer 15 (d2<d1).

The base material section 24 is mainly formed of a substrate body 21 made of a transparent material such as glass. On the inner surface of the substrate body 21, counter electrode 22 made of a conductive, transparent material such as ITO is formed. The counter electrode 22 is formed covering the entire surface of the substrate body 21. On the counter electrode 22, a passivation film 23 is formed by means of, for example, the CVD process. This passivation film 23 is made of the same material as the passivation film 13. On the outer surface of the substrate body 21, a sheet polarizer 42 is formed. The counter substrate 20 is provided with a color filter and a light-shielding film.

A liquid crystal layer 30 is formed between the device substrate 10 and counter substrate 20, and the initial orientation thereof is set to be a vertical orientation by the first alignment layer 15 and the second alignment layer 25. Specifically, the initial orientation of the liquid crystal layer 30 is a vertical orientation. In other words, the orientation is set to be a vertical orientation when no voltage is applied to the liquid crystal layer 30.

The first alignment layer 15 and second alignment layer 25 are formed by evaporating the materials for an alignment layer on the substrate bodies 11 and 21, respectively by means of an oblique evaporation process. Accordingly, each of the first alignment layer 15 and second alignment layer 25 includes multiple pillar-shaped laminated materials forming a porous surface. These pillar-shaped laminated materials constitute a surface corresponding to the input angle in the oblique evaporation process. This surface applies the pretilt angle to the liquid crystal molecules 30a of the liquid crystal layer 30 that is on the surface. Note that the pretilt angle is an angle with respect to a line perpendicular to the substrate bodies 11 and 21. In addition, the surfaces of the first alignment layer 15 and second alignment layer 25 specify the oblique direction of the liquid crystal molecules 30a when the liquid crystal display device 1 is driven. The first alignment layer 15 and second alignment layer 25 may be made of silicon oxide (SiOx). In this case, silicon oxide is an inorganic material containing at least one of $SiO_2$ and SiO. Alternatively, an inorganic material containing SiON or SiN may be used instead of silicon oxide.

As described above, the technique described in JP-A-2005-49817 has provided the reflective liquid crystal display device in which the work function adjusting layer is formed on the pixel electrode. In this device, the sum of the work functions of the materials for the pixel electrode and work function adjusting layer is substantially the same as the work function of the material for the counter electrode. Thus, the work function adjusting layer counteracts the imbalance between the work functions of the materials for the pixel and counter electrode.

However, the abovementioned display device involves an additional process of forming the work function adjusting layer on the pixel electrode. This increases the amount of fabrication work, and complicates the structure of the device.

As a result of diligent study, the inventors of this application have found that controlling the densities and thicknesses of the first alignment layer 15 and second alignment layer 25 is important in restricting the LCCOM shift. Specifically, the liquid crystal display device 1 employs a structure in which the density $\rho 1$ of the first alignment layer 15 is substantially the same as the density $\rho 2$ of the second alignment layer 25, and the thickness d1 of the first alignment layer 15 is larger than the thickness d2 of the second alignment layer 25.

In further detail, the density $\rho 1$ of the first alignment layer 15 and the density $\rho 2$ of the second alignment layer 25 are each set to 1.93 $g/cm^3$. Thus, the relationship of $\rho 1 = \rho 2$ is established. Furthermore, the thickness d1 of the first alignment layer 15 and the thickness d2 of the second alignment layer 25 are set to 74.4 nm and 71.6 nm, respectively. Thus, the thickness d1 of the first alignment layer 15 is greater than the thickness d2 of the second alignment layer 25. The relationship of d1>d2 is established.

By setting the density $\rho 1$ of the first alignment layer 15 and the density $\rho 2$ of the second alignment layer 25 to the same value as described above, the orientation of the liquid crystal layer 30 can be controlled more easily. Moreover, the inventors have confirmed that the orientation of the liquid crystal layer 30 is not affected by the difference between the thickness d1 of the first alignment layer 15 and the thickness d2 of the second alignment layer 25. Therefore, the structure, in which the density $\rho 1$ of the first alignment layer 15 is substantially the same as the density $\rho 2$ of the second alignment layer 25, and the thickness d1 of the first alignment layer 15 is larger than the thickness d2 of the second alignment layer 25, makes it possible to restrict the occurrence of display defects such as flickering, without affecting the orientation of the liquid crystal layer 30.

The density $\rho 1$ of the first alignment layer 15 does not necessarily have to be exactly the same as the density $\rho 2$ of the second alignment layer 25. The density $\rho 1$ of the first alignment layer 15 may be simply substantially the same as the density $\rho 2$ of the second alignment layer 25. The expression "substantially the same" implies within a manufacturing tolerance for the first alignment layer 15 and the second alignment layer 25. For example, it is preferable that the ratio of the density $\rho 1$ of the first alignment layer 15 to the density $\rho 2$ of the second alignment layer 25 fall within a range of equal to or more than 0.99/1 to equal to or less than 1.01/1.

It is preferable that the ratio of the thickness d1 of the first alignment layer 15 to the thickness d2 of the second alignment layer 25 fall within a range of more than 1/1 to less than 1.2/1. In this embodiment, the thickness d1 of the first alignment layer 15 is set to 74.4 nm, while the thickness d2 of the second alignment layer 25 is set to 71.6 nm. In this case, the ratio of the thickness d1 of the first alignment layer 15 to the thickness d2 of the second alignment layer 25 is 74.4/71.6 (=1.04/1). As described above, the ratio of the thickness d1 of the first alignment layer 15 to the thickness d2 of the second alignment layer 25, which is 1.04/1, is set to fall within the range of more than 1/1 to less than 1.2/1. This thickness ratio is optimized to restrict the occurrence of display defects such as flickering, thereby improving the display performance of the liquid crystal display effectively.

In contrast, if the ratio of the thicknesses of the first alignment layer 15 to the second alignment layer 25 is 1/1, or if the first alignment layer 15 is as thick as the second alignment layer 50, then the liquid crystal display device 1 fails to provide the above-described quality. Also, if the ratio of the thickness of the first alignment layer 15 to the thickness of the second alignment layer 25 is less than 1/1, then the display quality of the liquid crystal display device may not be improved effectively, because the first alignment layer 15 is too thin. Likewise, if the ratio of the thickness of the first alignment layer 15 to the thickness of the second alignment layer 25 is equal to or more than 1.2/1, then the display quality of the liquid crystal display device may not be improved effectively, because the first alignment layer 15 is too thick.

In the structure of this embodiment, the density $\rho 1$ of the first alignment layer 15 is substantially the same as the density $\rho 2$ of the second alignment layer 25. Accordingly, the first alignment layer 15 and second alignment layer 25 can be fabricated from similar materials. Moreover, since any additional layer such as the work function adjusting layer does not need to be formed on the pixel electrode, no extra effort is required and the complexity of the structure of the liquid crystal display device 1 is not increased. Consequently, it is possible to provide the liquid crystal display device 1 which has an easily fabricated, simple structure, and achieves the high quality display performance by restricting the occurrence of display defects such as flickering.

In the structure of this embodiment, the pixel electrode 12 and counter electrode 22 are made of Al and ITO, respectively. Therefore, the imbalance between the work functions of the materials for the pixel electrode 12 and counter electrode 22, or the imbalance between the properties of the materials for the device substrate 10 and counter substrate 20 is more prominent than when both the pixel electrode and counter electrode are made of the same material such as ITO. Accordingly, since the properties of the device substrate 10 and counter substrate 20 sandwiching the liquid crystal layer 30 are different from each other, the liquid crystal display device 1 generates a greater LCCOM shift than the liquid crystal display device does in which the pixel electrode and counter electrode are made of the same material such as ITO. As a result, the liquid crystal display device 1 can improve the display performance by restricting the occurrence of display defects such as flickering.

In the structure of this embodiment, since the first alignment layer 15 and second alignment layer 25 are made of silicon oxide, the liquid crystal display device 1 possesses excellent heat and light resistance properties. Consequently, it is possible to provide the liquid crystal display device 1 that is ideal for use in projectors.

In the structure of this embodiment, since the liquid crystal layer 30 is mainly made of a liquid crystal material having negative dielectric anisotropy, the liquid crystal display device 1 can be of a vertical alignment (VA) type possessing high contrast. Consequently, it is possible to provide the liquid crystal display device 1 that is ideal for use in projectors.

In this embodiment, the description has been given for the case where the liquid crystal display device 1 has the counter electrode 22 made of ITO. However, the material of the counter electrode 22 is not limited to ITO. For example, indium zinc oxide (IZO) may be used.

Electronic Apparatus

Figure 2:
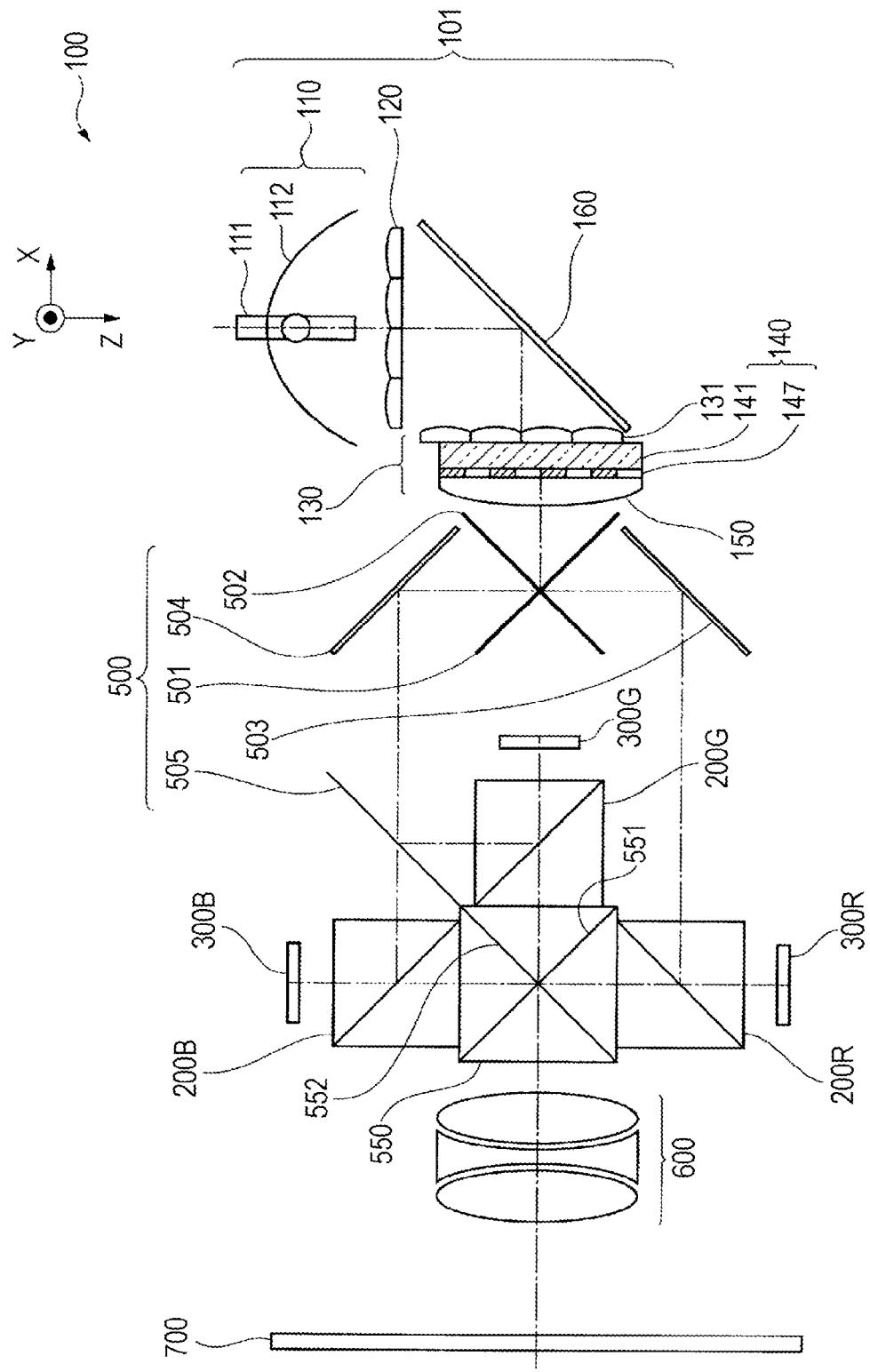
FIG. 2 is a schematic view illustrating a general structure of a projector as an example of an electronic apparatus according to the embodiment of the invention.

Next, with reference to FIG. 2, a description will be given below of a structure of a projector including the liquid crystal display device 1 of the embodiment as a light modulator, which exemplifies an electronic apparatus of the invention. FIG. 2 schematically illustrates a general structure of a projector 100 including the liquid crystal display device 1 as a light modulator.

The projector 100 of this embodiment is provided with a polarizing illumination device 101 mainly including a light source unit 110, a lens array 120, a reflection mirror 160, and an optical element 130. Furthermore, the projector 100 includes a color separation optical system 500, multiple reflective liquid crystal elements 300R, 300G and 300B, a cross dichroic prism 550, and a projection optical system 600. Specifically, the color separation optical system 500 separates a light beam output from the polarizing illumination device 101 into light beams of three colors. The reflective liquid crystal elements 300R, 300G and 300B modulate the respective light beams separated by the color separation optical system 500. The cross dichroic prism 550 synthesizes the light beams modulated by the reflective liquid crystal elements 300R, 300G and 300B. The projection optical system 600 projects, on a projection surface 700, the light beam synthesized by the cross dichroic prism 550. Moreover, the projector 100 includes three polarization beam splitters 200R, 200G and 200B. These polarization beam splitters 200R, 200G and 200B reflect the light beams separated by the color separation optical system 500, thereby directing the light beams to the respective reflective liquid crystal elements 300R, 300G and 300B. In addition, the polarization beam splitters 200R, 200G and 200B allow the light beams modulated by the reflective liquid crystal elements 300R, 300G and 300G to pass therethrough, thereby permitting the light beams to reach the cross dichroic prism 550.

The light source unit 110 mainly includes a light source lamp 111 and a parabolic reflector 112. The light source lamp 111 emits light, and the parabolic reflector 112 reflects the light in a single direction. As a result, a substantially collimated light beam enters the lens array 120. The light source lamp 111 may be a metal halide lamp, a Xenon lamp, a high-pressure mercury lamp, a halogen lamp, or the like. In addition, the parabolic reflector 112 may be replaced by an elliptic reflector, a spherical reflector, or the like.

The reflection mirror 160 is placed between the lens array 120 and optical element 130. The reflection mirror 160 reflects the light beam that has passed through the lens array 120, and the reflected light beam enters the optical element 130.

The optical element 130 is a complex assembly, which mainly includes a focus lens array 131, a plate-shaped polarizing conversion element 140 composed of a polarizing separation unit array 141 and a selective phase difference plate 147, and an output lens 150. This output lens 150 overlays the intermediate light beam that is output from the polarizing conversion element 140, onto the reflective liquid crystal elements 300R, 300G and 300B. The optical element 130 separates the intermediate light beam into light beams of P and S polarizations, and aligns the polarizations of the light beams with each other, thus leading the light beams of substantially aligned polarizations towards a single area for irradiation.

In the polarizing illumination device 101, the light source unit 110 outputs a light beam of random polarizations, the lens array 120 divides this light beam into the multiple intermediate light beams, and the optical element 130 converts these intermediate light beams into the light beams of substantially aligned polarizations, or a light beam of a single polarization. Note that the single polarization corresponds to the S polarization in this embodiment.

The color separation optical system 500 separates the light beam output from the polarizing illumination device 101 into a red light beam R, a green light beam G and a blue light beam B. This color separation optical system 500 includes a blue/green light reflective dichroic mirror 501, a red light reflective dichroic mirror 502, a green light reflective dichroic mirror 505, and two reflection mirrors 503 and 504.

The polarizing illumination device 101 outputs the light beam, and this light beam enters the color separation optical system 500. The red light reflective dichroic mirror 502 reflects the red light R component contained in the light beam output from the polarizing illumination device 101 toward the reflection mirror 503. In this manner, the red light R enters the polarization beam splitter 200R.

The blue/green light reflective dichroic mirror 501 reflects the green light G and blue light B components contained in the light beam output from the polarizing illumination device 101 toward the reflection mirror 504. Furthermore, the reflection mirror 504 reflects the green light G and blue light B toward the green light reflective dichroic mirror 505, and the green light G and blue light B enter the green light reflective dichroic mirror 505. This green light reflective dichroic mirror 505 reflects only the green light G component. The green light G reflected by the green light reflective dichroic mirror 505 enters the polarization beam splitter 200G. Meanwhile, the blue light B that has passed through the green light reflective dichroic mirror 505 enters the polarization beam splitter 200B.

When the respective light beams of the S polarization enter the polarization beam splitters 200R, 200G and 200B, the respective light beams are almost completely reflected by the S polarization reflective films of the polarization beam splitters 200R, 200G and 200B, and are delivered to the reflective liquid crystal elements 300R, 300G and 300B.

The reflective liquid crystal elements 300R, 300G and 300B modulate the respective incident light beams on the basis of predetermined image information, and output the modulated light beams to the polarization beam splitters 200R, 200G and 200B, respectively. In this case, only light components of the light beams which pass through the S polarization reflective films of the polarization beam splitters 200R, 200G and 200B are delivered to the cross dichroic prism 550. When the light beams enter the polarization beam splitters 200R, 200G and 200B, only the parts of the respective light beams which pass through the S polarization reflective films of the polarization beam splitters 200R, 200G and 200B are delivered to the cross dichroic prism 550.

The cross dichroic prism 550 is composed of four triangular prisms, each of which has an isosceles triangle shaped cross section on an X-Z plane. These triangular prisms are bonded to one another at the side surfaces thereof, and two dichroic films 551 and 552 having wavelength selectivity are formed along the bonded surfaces. Specifically, the dichroic film 551 is adapted to reflect red light R and allow green light G and blue light B to pass therethrough. The dichroic film 552 is adapted to reflect blue light B and allow red light R and green light G to pass therethrough. Accordingly, when incident on the cross dichroic prism 550, the light beams are synthesized in accordance with the wavelength selectivity of the dichroic films 551 and 552. Then, the projection optical system 600 projects the synthesized light beam onto the projection surface 700.

The projector 100 of this embodiment achieves a high quality display performance by restricting the occurrence of display defects such as flickering, because this projector is equipped with the above-described liquid crystal display device 1.

Note that an electronic apparatus of the invention has been implemented by the projector in this embodiment. However, application of the electronic apparatus of the invention is not limited to projectors. Alternatively, the electronic apparatus of the invention may be applied to cellular phones, personal computers, monitors for video cameras, car navigation systems, pagers, personal digital assistances, calculators, word processors, work stations, video telephones, POS terminals, digital still cameras, or apparatuses equipped with a touch panel.

EXAMPLE

A description will be given below of an example of the embodiment of the invention. In this example, two liquid crystal display devices were prepared. In these devices, first alignment layers formed in device substrates and second alignment layers formed in counter substrates had different densities and thicknesses. The LCCOM shifts of the two liquid crystal display devices were measured and compared, for the purpose of verifying the effect of the embodiment of the invention.

Specifically, one of the liquid crystal display devices was one according to the first embodiment (reference sample). The other of the liquid crystal display devices had the first alignment layer and second alignment layer, the respective thicknesses of which were significantly different from those of the reference sample (comparative sample). A test was conducted under the condition of both samples being stored at 70° C. for 60 minutes while applying electricity to the samples. Subsequently, it was checked whether or not the LCCOM shifts of the respective samples were less than a predetermined value. In this test, the predetermined value was 0.1 V. This value was set as a limit acceptable for preventing flickering, image-sticking, etc.

Figure 3:
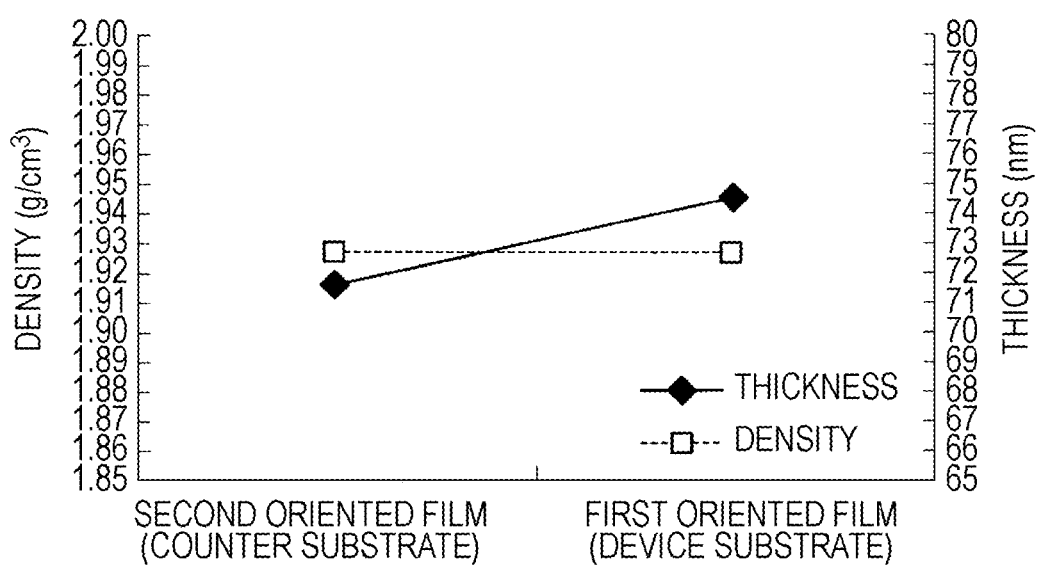
FIG. 3 is a graph illustrating relationships, in the density and the thickness, between a first alignment layer and a second alignment layer in a liquid crystal display device according to the reference sample of the invention.

FIG. 3 is a graph illustrating relationships, in the density and the thickness, between a first alignment layer and a second alignment layer in the sample of the invention. In other words, this graph illustrates the relationship between the first alignment layer 15 having the density $\rho 1$ and thickness d1 of the device substrate 10 and the second alignment layer 25 having the density $\rho 2$ and thickness d2 of the counter substrate 20. In this example, the density $\rho 1$ of the first alignment layer 15 and the density $\rho 2$ of the second alignment layer 25 were each 1.93 g/cm$^3$, namely, the same as each other ($\rho 1 = \rho 2$). In addition, the thickness d1 of the first alignment layer 15 was 74.4 nm, and the thickness d2 of the second alignment layer 25 was 71.6 nm. In other words, the thickness d1 of the first alignment layer 15 was greater than the thickness d2 of the second alignment layer 25 (d1>d2). The result of the test in which the sample was stored at 70° C. for 60 minutes showed an LCCOM shift of 0.002 V.

FIG. 4 is a graph illustrating relationships, in the density and the thickness, between a first alignment layer and a second alignment layer in the comparative sample. In this example, the density of the first alignment layer was 2.02 g/cm$^3$, while the density of the second alignment layer was 2.04 g/cm$^3$. In addition, the thickness of the first alignment layer was 43.1 nm, while the thickness of the second alignment layer was 70.0 nm. In other words, the thickness of the first alignment layer was less than that of the second alignment layer. The result of the test in which the sample was stored at 70° C. for 60 minutes showed an LCCOM shift of −0.210 V.

As described above, the results of the test in which the samples were stored at 70° C. for 60 minutes showed that the liquid crystal display device of the reference sample, in which the density $\rho 1$ of the first alignment layer 15 and the density $\rho 2$ of the second alignment layer 25 were each 1.93 g/cm$^3$, namely, the same as each other ($\rho 1 = \rho 2$), and the thickness d1 of the first alignment layer 15 was 74.4 nm and the thickness d2 of the second alignment layer 25 was 71.6 nm, namely, the thickness d1 of the first alignment layer 15 being greater than the thickness d2 of the second alignment layer 25 (d1>d2), had an LCCOM shift of 0.002 V. This test result demonstrated that the LCCOM shift was reduced to less than the acceptable value, set at 0.1 V, for preventing flickering, image-sticking, etc.

As described above, it was confirmed that the liquid crystal display device 1 was capable of restricting the occurrence of display defects, such as flickering and image-sticking, due to the structure where the density $\rho 1$ of the first alignment layer 15 was substantially the same as the density $\rho 2$ of the second alignment layer 25, and the thickness d1 of the first alignment layer 15 was greater than the thickness d2 of the second alignment layer 25.

The entire disclosure of Japanese Patent Application No. 2011-010576, filed Jan. 21, 2011 is expressly incorporated by reference herein.

What is claimed is:

1. A liquid crystal display device comprising: a device substrate that includes a pixel electrode;
    a counter substrate that includes a counter electrode and that is formed opposite the device substrate;
    a liquid crystal layer that is formed between the device substrate and the counter substrate;
    a first alignment layer that is formed on a side of the device substrate which is closer to the liquid crystal layer; and
    a second alignment layer that is formed on a side of the counter substrate which is closer to the liquid crystal layer;
    wherein the pixel electrode is made of a material having a work function smaller than that of a material for the counter electrode, and
    wherein the first alignment layer has substantially the same density as that of the second alignment layer, and the first alignment layer has a thickness greater than that of the second alignment layer to restrict LCCOM shift.

2. The liquid crystal display device according to claim 1, wherein the pixel electrode is made of Al, and the counter electrode is made of ITO.

3. An electronic apparatus comprising the liquid crystal display device according to claim 2.

4. The liquid crystal display device according to claim 1, wherein a ratio of the thickness of the first alignment layer to the thickness of the second alignment layer is set to fall within a range of more than 1/1 to less than 1.2/1.

5. An electronic apparatus comprising the liquid crystal display device according to claim 4.

6. The liquid crystal display device according to claim 1, wherein the first alignment layer and the second alignment layer are made of silicon oxide.

7. An electronic apparatus comprising the liquid crystal display device according to claim 6.

8. The liquid crystal display device according to claim 1, wherein the liquid crystal layer is made of a liquid crystal composition containing, as a main component, a liquid crystal material having negative dielectric anisotropy.

9. An electronic apparatus comprising the liquid crystal display device according to claim 8.

10. An electronic apparatus comprising the liquid crystal display device according to claim 1.

\* \* \* \* \*